(12) United States Patent
Gripemark et al.

(10) Patent No.: US 7,261,193 B2
(45) Date of Patent: Aug. 28, 2007

(54) SUPPORTED DISC

(75) Inventors: Joakim Gripemark, Helsingborg (SE); Lars Severinsson, Hishult (SE); Anders Ortegren, Landskrona (SE); Patrik Kall, Helsingborg (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 11/077,390

(22) Filed: Mar. 10, 2005

(65) Prior Publication Data

US 2005/0205368 A1 Sep. 22, 2005

Related U.S. Application Data

(63) Continuation of application No. PCT/EP03/009934, filed on Sep. 8, 2003.

(30) Foreign Application Priority Data

Sep. 10, 2002 (SE) .................................. 0202705

(51) Int. Cl.
*F16D 65/12* (2006.01)

(52) U.S. Cl. ............................ 188/218 XL; 188/18 A; 188/234

(58) Field of Classification Search ......... 188/218 XL, 188/17, 18 A, 18 R, 234, 250 G
See application file for complete search history.

(56) References Cited

U.S. PATENT DOCUMENTS

| 4,576,255 | A | 3/1986 | Mery et al. ................ 188/71.5 |
| 4,598,799 | A | 7/1986 | Thioux ...................... 188/71.5 |
| 4,613,021 | A * | 9/1986 | Lacombe et al. ..... 188/218 XL |
| 6,305,510 | B1 | 10/2001 | Bunker ................. 188/218 XL |
| 6,705,437 | B2 * | 3/2004 | Severinsson et al. .... 188/73.32 |
| 6,910,556 | B1 * | 6/2005 | Baumgartner et al. ...... 188/218 XL |

FOREIGN PATENT DOCUMENTS

| EP | 0521785 A1 * | 1/1993 |
| JP | 3333 A * | 1/1991 |
| JP | 646534 A * | 1/1999 |
| WO | WO-0063575 A1 * | 10/2000 |
| WO | WO-0198681 A1 * | 12/2001 |
| WO | WO-02073061 A1 * | 9/2002 |
| WO | WO 03/062662 A1 | 7/2003 |

* cited by examiner

*Primary Examiner*—Melody M. Burch
(74) *Attorney, Agent, or Firm*—St. Onge Steward Johnston & Reens LLC (57) ABSTRACT

The present invention concerns a disc brake having one or more sliding or floating brake discs. The discs are received on a hub by means of splines on the discs and hub, respectively. The discs have means to widen the support of each disc on the hub. The means may have the form of one or more rings, pins and/or clips attached to the discs.

5 Claims, 9 Drawing Sheets

SUPPORTED DISC

This application is a continuation of pending International Patent Application No. PCT/EP2003/009934 filed Sep. 8, 2003, which designates the United States and claims priority of pending Swedish Application No. 0202705-0 filed Sep. 10, 2002.

FIELD OF THE INVENTION

The present invention concerns a disc brake having one or more sliding or floating brake discs. More specifically it concerns means for support of said sliding disc(s).

The present invention is developed for disc brakes having a fixed caliper and one or more sliding discs. However, a person skilled in the art realizes that the invention may also be used with other types of brakes, e.g. disc brakes having one fixed disc, one or more sliding discs and a sliding (floating) or fixed caliper.

PRIOR ART

Besides low costs of manufacture and maintenance, a general object when designing brakes is that they should be as compact as possible and have low weight. Thereby they are relatively easy to adapt to different vehicles and axle configurations.

In searching for compact and cost-effective brake designs it is previously known to use splines or similar means to arrange e.g. one or more brake disc slidable but non-rotatable on a hub. Due to an often limited, available space the discs must be made relatively thin. The thin discs are susceptible to locking when sliding, due to becoming skewed. Furthermore, the discs may wobble during use creating noise and vibration problems.

SUMMARY OF THE INVENTION

The problem with locking due to skewed discs may be solved by making the width of the discs rather big, in particular the splined part which guides the disc on the hub.

However, if the available space is limited it may not be possible to allow a disc design that is wide enough. Thus, one object of the present invention is to save space and weight and yet avoid the above problems.

The present invention is directed to, a disc brake having one or more brake discs received slideable on a hub by means of splines or similar means on the discs and hub, respectively. The discs have means to widen the support of each disc on the hub.

By means of the present invention a number of advantages are reached. The useful life of the brake may be increased as sliding parts may be replaced. The sliding parts may be made of suitable materials, preferably having low tendency of wearing and corroding. As the discs may be relatively thin they have a low weight. The risk or skewing and/or wobbling is reduced, and thus the risk of noise and vibration generation. The guiding of the brake discs in relation to each other and in relation to the hub is improved. The guiding is elastic to some extent, which means lower sensitivity regarding the way the discs are received on the hub.

The brake discs may be produced in a simple way and "standard" discs may be used as the extra support means are attached to the finished discs. The only adaptation needed is normally the exact form of the splines or similar means.

In some embodiments an extra recess may be formed at one side of the brake discs. This assists in keeping the costs of the brake relatively low.

Further objects and advantages of the invention will be obvious for a person skilled in the art from reading the detailed description below of preferred embodiments of the invention.

DETAILED DESCRIPTION OF PREFERRED EMBODIMENTS

In this description expressions like "axial", "radial" are with reference to the hub as shown in the enclosed drawings. As the present invention is directed to the co-operation between one or more brake discs and a hub or the like, other parts of the disc brake are neither shown nor described. A person skilled in the art realizes that the exact design of the hub may vary. Thus, as used in this description the expression "hub" should be construed broadly as a part transferring movement of a wheel axle to the brake disc or discs.

Figure 1:
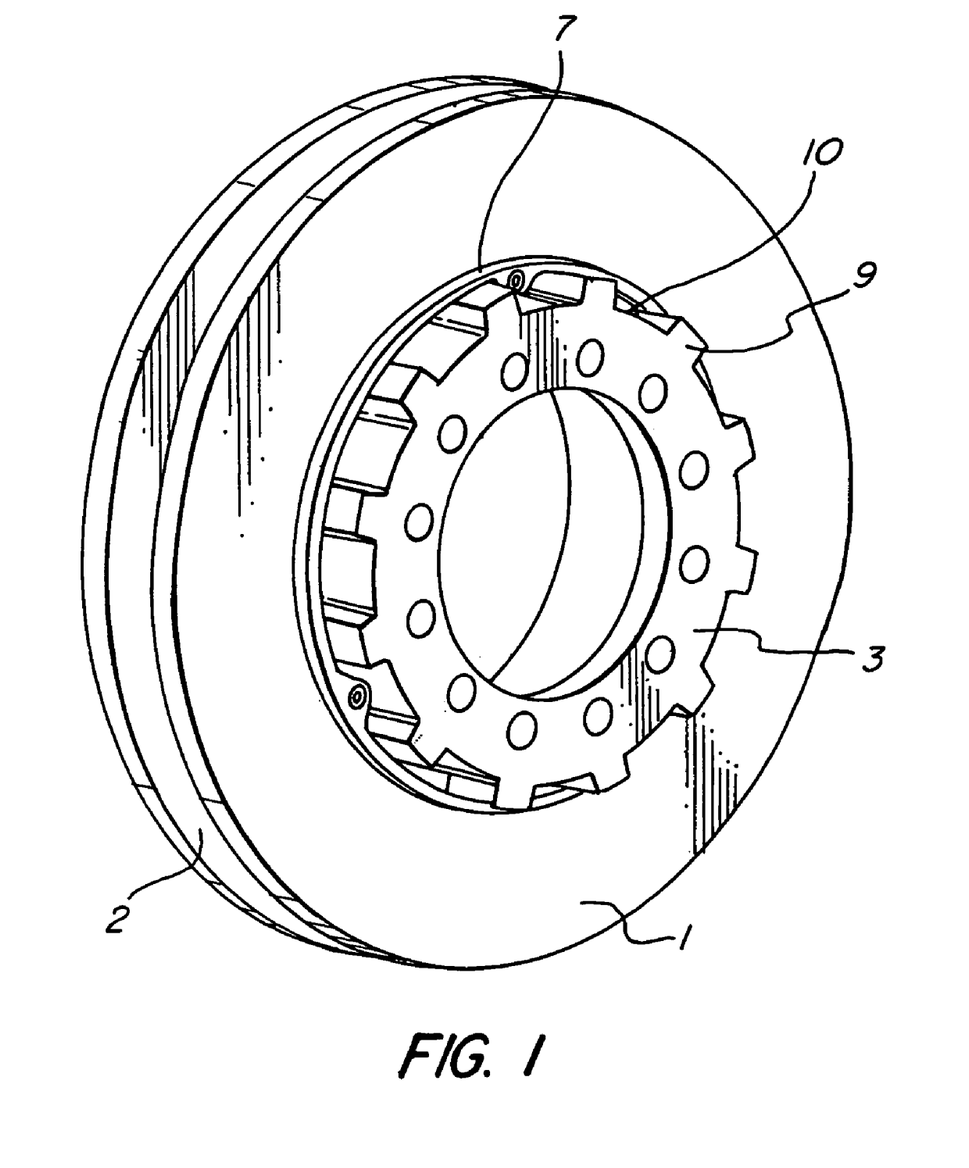
FIG. 1 is a schematic, perspective view of brake discs and a hub of a disc brake according to the present invention.
Figure 2:
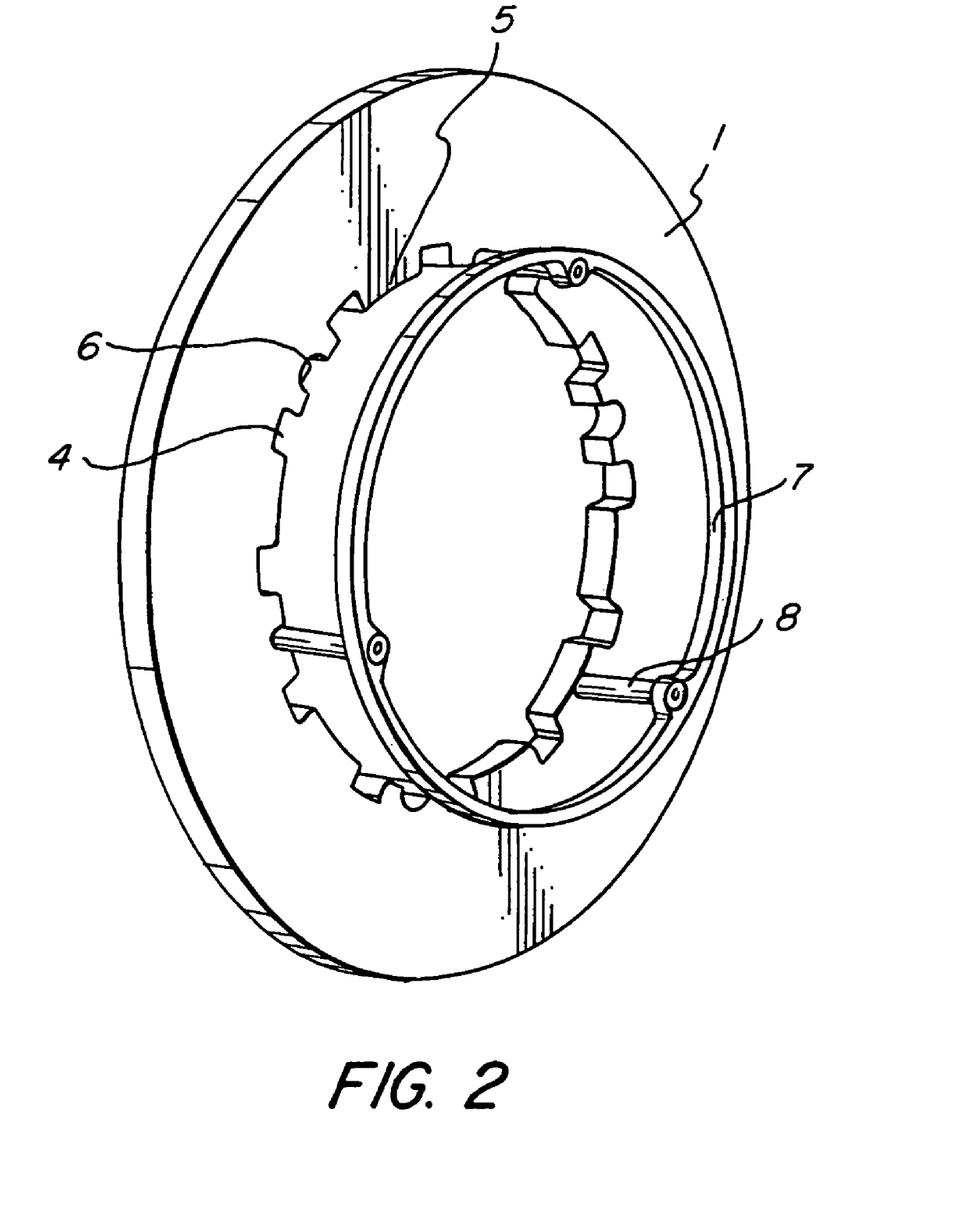
FIG. 2 is a perspective view of one brake disc of FIG. 1.

In a first embodiment the disc brake comprises two sliding brake discs 1, 2 received on a hub 3. The brake discs 1, 2 are received sliding in relation to the hub 3 by means of splines 4, 5; 9, 10 on the brake discs 1, 2 and the hub 3, respectively. The splines on the brake discs 1, 2 are formed of grooves 4 and raised parts 5. In the same way the splines of the hub 3 are formed of raised parts 9 and grooves 10. The splines 4, 5; 9, 10 have a general axial extent in the discs 1, 2 and the hub 3, respectively.

On at least one side of each brake disc 1, 2 a ring 7, 11 is arranged on an axial distance from the brake disc 1, 2. The rings 7, 11 are attached to the brake disc 1, 2 by means of pins 8, 12. One end of each pin 8, 12 is fixed to the brake disc 1, 2 and the other end of the pin 8, 12 is fixed to the ring 7, 11. The inner diameter of each ring 7, 11 corresponds with the outer diameter of the hub 3, i.e. the diameter formed of the raised parts 9 of the splines of the hub 3.

The pins 8, 12 holding the rings 7, 11 are received in recesses 6 in adjacent brake discs 1, 2. Thus, the outer form of the pins 8, 12 and the form of the recesses 6 are adapted to each other. The pins 8, 12 will move in relation to the recesses 6 of adjacent discs 1, 2. Normally the pins 8, 12 move with a clearance to the recesses 6, as the rings 7, 11 are to give the support. Even though only three pins 8, 12 are shown for holding each ring 7, 11, a person skilled in the art realizes that any number of pins 8, 12 may be used. The pins 8, 12 of adjacent rings 7, 11 are positioned to not interfere with each other during movement of the discs 1, 2.

The pins 8, 12 are fixed to the brake discs 1, 2 and rings 7, 11 in any suitable way. Thus, the pins 8, 12 may be fixed by means of threads, welding, soldering, glue etc.

By means of the rings 7, 11 placed in contact with the hub 3 any tendency of the brake discs 1, 2 to become skewed or to wobble is counter-acted. Thus, it could be said that the supports of the brake discs 1, 2 are widened, since the rings 7, 11 assist in supporting the brake discs 1, 2.

Furthermore, the rings take up any skewing movement which means that the splines 4, 5; 9, 10 of the brake discs 1, 2 and hub 3, respectively, will not have to take up such movement. The splines 4, 5; 9, 10 are only to transfer rotational movement. The consequence of this is that the fit between the splines is less critical compared to previously known embodiments.

The distance between each brake disc 1, 2 and associated ring 7, 11 is adapted to the thickness of the brake pads (not shown). Thus, the distance should be large enough to enable two or more discs 1, 2 to be separated enough to give room for new, not worn brake pads. As the brake pads are worn during use of the brake the distance between the brake discs 1, 2 will decrease, as is well known.

Figure 3:
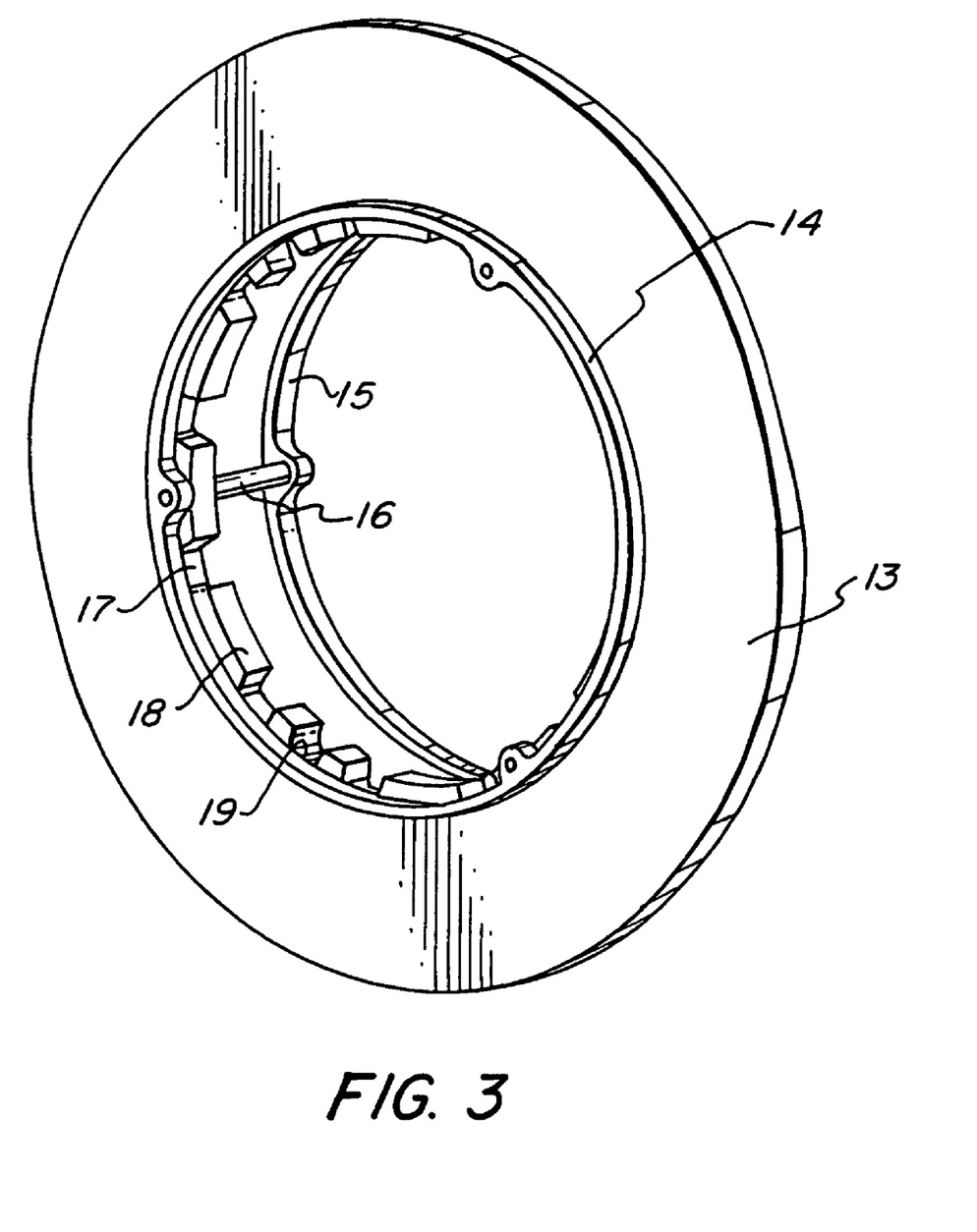
FIG. 3 is a perspective view of an alternative brake disc to the one of FIG. 2.

In FIG. 3 an alternative brake disc 13 is shown, which disc 13 could replace one or all of the discs 1, 2 of the embodiment of FIGS. 1 and 2. Two rings 14, 15 are arranged at the brake disc 13. One ring 15 is held at a distance from the brake disc 13, while the other ring 14 is placed directly at the brake disc 13. The rings 14, 15 are placed on opposite sides of the disc 13. Also this brake disc 13 is to be received slideable on a hub (not shown) by means of splines 17, 18. A number of pins 16 are placed between the rings and are fixed to each ring 14, 15. These pins 16 may be seen as prolonged pins 8, 12 of the embodiment of FIGS. 1 and 2. The pins 16 are normally fixed to the rings 14, 15 by means of threads. The pins 16 go through raised parts 18 of the spline of the disc 13. The pins of adjacent brake discs are received in recesses 19 of raised parts 18 of the splines of the brake disc 13.

The pins 16 of adjacent brake discs 13 are placed not to interfere with each other.

In a second embodiment (FIGS. 4 and 5) brake discs 21, 22 are received on a hub 23. As for the previous embodiment the discs 21, 22 are received sliding on the hub 23 by means of splines 24, 25; 29, 30 of the discs 21, 22 and the hub 23, respectively.

Figure 4:
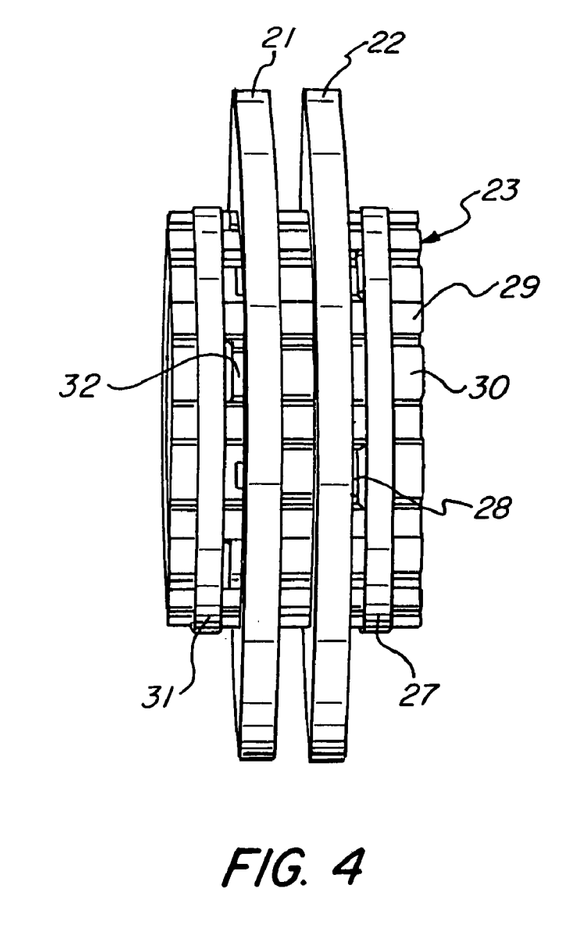
FIG. 4 is a schematic side view of an alternative embodiment of a disc brake according to the present invention.
Figure 5:
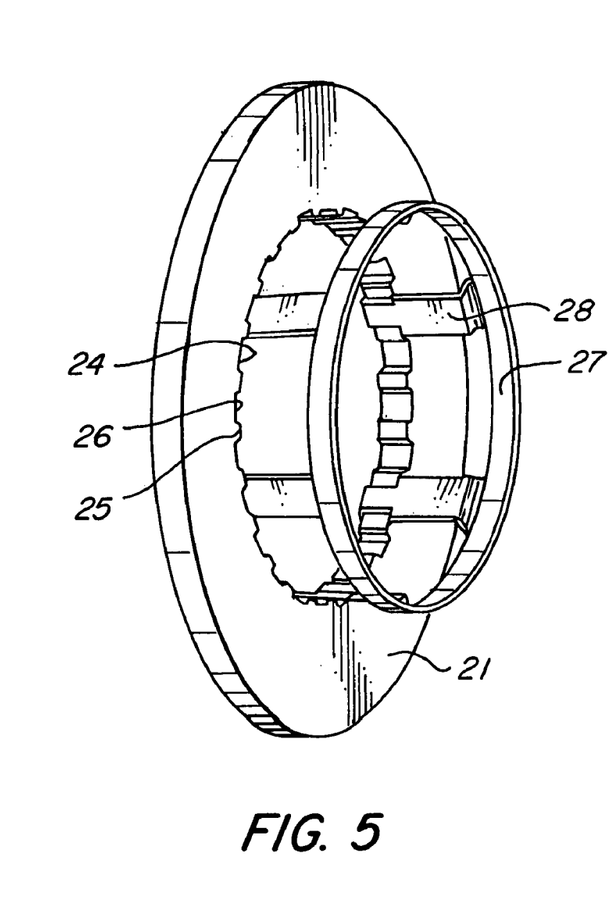
FIG. 5 is a perspective view of a brake disc of FIG. 4.

To each brake disc 21, 22 a ring 27, 31 is attached placed at a distance from the brake disc 21, 22. The ring 27, 31 is held at the disc 21, 22 by means of a number of legs 28, 32. In the shown embodiment six legs 28, 32 are used, but a person skilled in the art realizes that any suitable number of legs 28, 32 may be used. The legs 28, 32 are received in recesses 26 of the raised parts 25 of the splines of the brake disc 21, 22. The legs 28, 32 of adjacent rings/discs are placed in alternating grooves 30 of the hub 23, so as not to interfere with each other. Preferably the legs 28, 32 are given such a form that they may be pressed onto the brake disc 21, 22. In the shown embodiment the free ends of the legs 28, 32 are bent to be placed around an edge of the brake disc 21, 22. Furthermore, the form of the legs 28, 32 and the recesses 26 are adapted to each other to keep the legs 28, 32 firm in the recesses 26.

To further fixate each ring 27, 31 to the hub 23 the legs 28, 32 may be fixed to the brake disc 21, 22 in any suitable way. Such fixation may be screws, rivets, welding, soldering, glue or other fastening means.

Normally the rings 27, 31 and the legs 28, 32 are formed as integrated parts, but a person skilled in the art realizes that they may also be separate parts fixed to each other in any suitable way.

The legs 28 of the rings 27, 31 will slide in the grooves 30 of the splines of the hub 23. The inner diameter of each ring 27, 31 is adapted to the outer diameter of the hub 23.

As for the previous embodiment the distance between each ring 27, 31 and the brake disc 21, 22 should be enough to give room for new brake pads (not shown).

In a third embodiment (FIGS. 6 and 7) brake discs 41, 42 are received on a hub 43. As for the previous embodiments the discs 41, 42 are received sliding on the hub 43 by means of splines 44, 45; 49, 40 of the discs 41, 42 and the hub 43, respectively.

Figure 6:
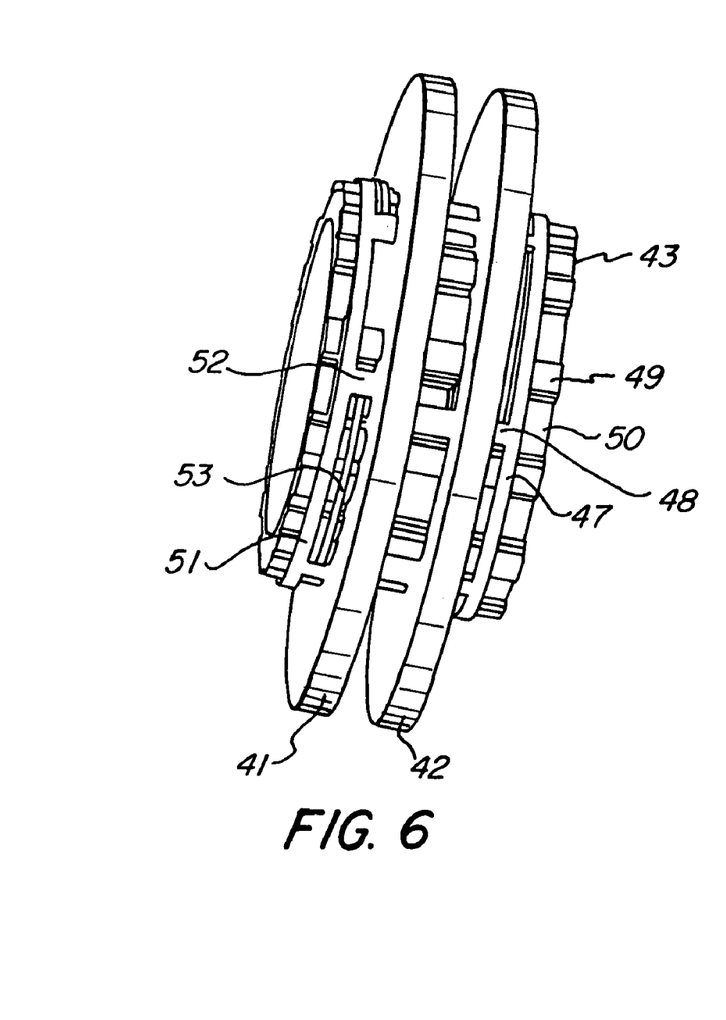
FIGS. 6 and 7 are views corresponding to FIGS. 4 and 5 of a third alternative embodiment of the present invention.
Figure 7:
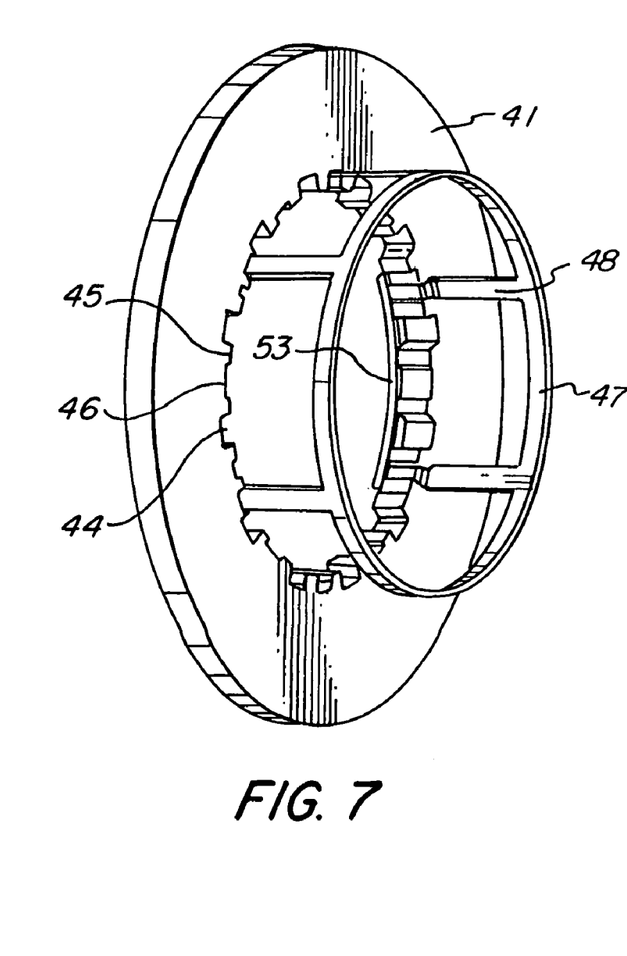

Each brake disc 41, 42 receives a ring 47, 51 placed at a distance from the brake disc 41, 42. The ring 47, 51 is held at the disc 41, 42 by means of a number of legs 48, 52. In the shown embodiment six legs 48, 52 are used, but a person skilled in the art realizes that any suitable number of legs may be used. The legs 48, 52 are received in recesses 46 of the raised parts 45 of the splines of the brake disc 41, 42. The legs 48, 52 of adjacent rings/discs are placed in alternating grooves 50 of the hub 43, so as not to interfere with each other.

Preferably the legs 48, 52 are given such a form that they may be pressed onto the brake disc 41, 42. In the shown embodiment the free ends of two adjacent legs 48, 52 are connected by means of a beam 53. Two such beams 53 are arranged for each ring 47, 51 in the shown embodiment. As the ring 47, 51 has six legs 48, 52 two legs are not connected to any beam. The legs 48, 52 not connected to any beam are placed opposite each other. The beams 53 have a curvature following the inner curvature of the brake disc 41, 42. The beams 53 may either be integrated parts of the ring 47, 51 and legs 48, 52 or may be fixed in any suitable way to the legs 48, 52. Also the rings 47, 51 and the legs 48, 52 are normally integrated parts but a person skilled in the art realizes that they may be separate parts fixed to each other in any suitable way.

The form of the rings 47, 51 and legs 48, 52 of this third embodiment makes it suitable to simply fix the rings 47, 51 to the brake discs 41, 42 by snapping the rings 47, 51 to the discs 41, 42.

Furthermore, the form of the legs 48, 52 and the recesses 46 are adapted to each other to keep the legs 48 firm in the recesses 46. To further fixate each ring 47, 51 to the hub 43 the legs 48 may be fixed to the brake disc 41, 42 in any suitable way. Such fixation may be screws, rivets, welding, soldering, glue or other fastening means.

The legs 48 of the rings 47, 51 will slide in the grooves 50 of the splines of the hub 43. The inner diameter of each ring 47, 51 is adapted to the outer diameter of the hub 43.

As for the previous embodiment the distance between each ring 47, 51 and the brake disc 41, 42 should be enough to give room for new brake pads (not shown).

In a fourth embodiment (FIGS. 8 and 9) brake discs 61, 62 are received on a hub 63. As for the previous embodiments the discs 61, 62 are received sliding on the hub 63 by means of splines 64, 65; 69, 70 of the discs 61, 62 and the hub 63, respectively.

Figure 8:
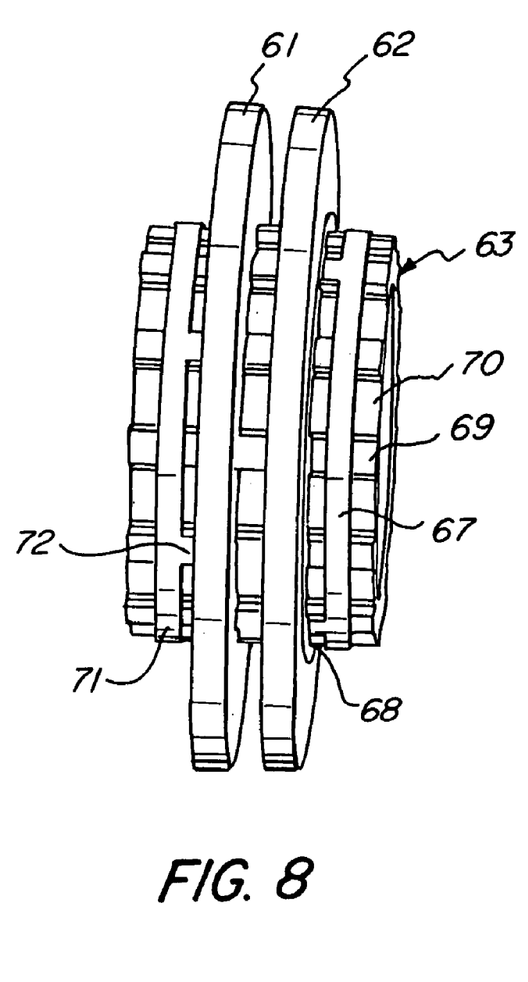
FIGS. 8 and 9 are views corresponding to FIGS. 4 and 5 of a fourth alternative embodiment of the present invention.
Figure 9:
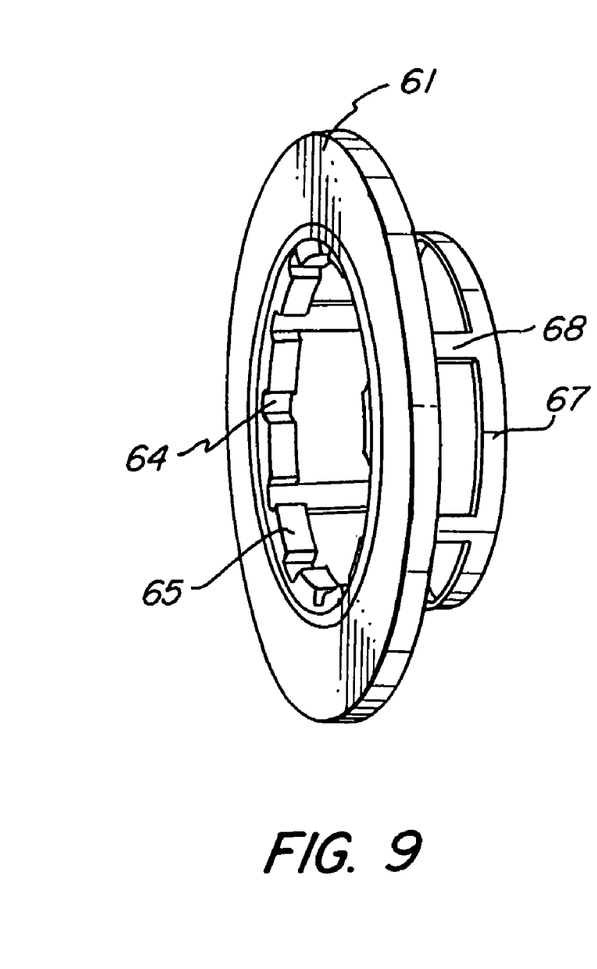

Each brake disc 61, 62 receives a ring 67, 71 placed at a distance from the brake disc 61, 62. The ring 67, 71 is held at the disc 61, 62 by means of a number of legs 68, 72. In the shown embodiment six legs 68, 72 are used, but a person skilled in the art realizes that any suitable number of legs may be used. This fourth embodiment differs from the second embodiment mainly only in that the legs 68, 72 are received in grooves 64 of the splines of the brake discs 61, 62. As the legs 68, 72 are placed directly in the splines, the splines of each brake disc 61, 62 and/or the hub 63 is adapted to also receive a leg 68, 72. The legs 68, 72 of adjacent rings/discs are placed on alternating raised parts 69 of the hub 63, so as not to interfere with each other.

Preferably the legs 68, 72 are given such a form that they may be pressed onto the brake disc 61, 62. In the shown embodiment the free ends of the legs 68, 72 are bent to be placed around an edge of the brake disc 61, 62. To further fixate each ring 67, 71 to the hub 63 the legs 68 may be fixed to the brake disc 61, 62 in any suitable way.

Such fixation may be screws, rivets, welding, soldering, glue or other fastening means.

The legs 68 of the rings 67, 71 will slide in the grooves 70 of the splines of the hub 63. The inner diameter of each ring 67, 71 is adapted to the outer diameter of the hub 63.

As for the previous embodiment the distance between each ring 67, 71 and the brake disc 61, 72 should be enough to give room for new brake pads (not shown).

In a fifth embodiment (FIGS. 10 and 11) brake discs 81, 82 are received on a hub 83. As for the previous embodiments the discs 81, 82 are received sliding on the hub 83 by means of splines 84, 85; 89, 90 of the discs 81, 82 and the hub 83, respectively.

Figure 10:
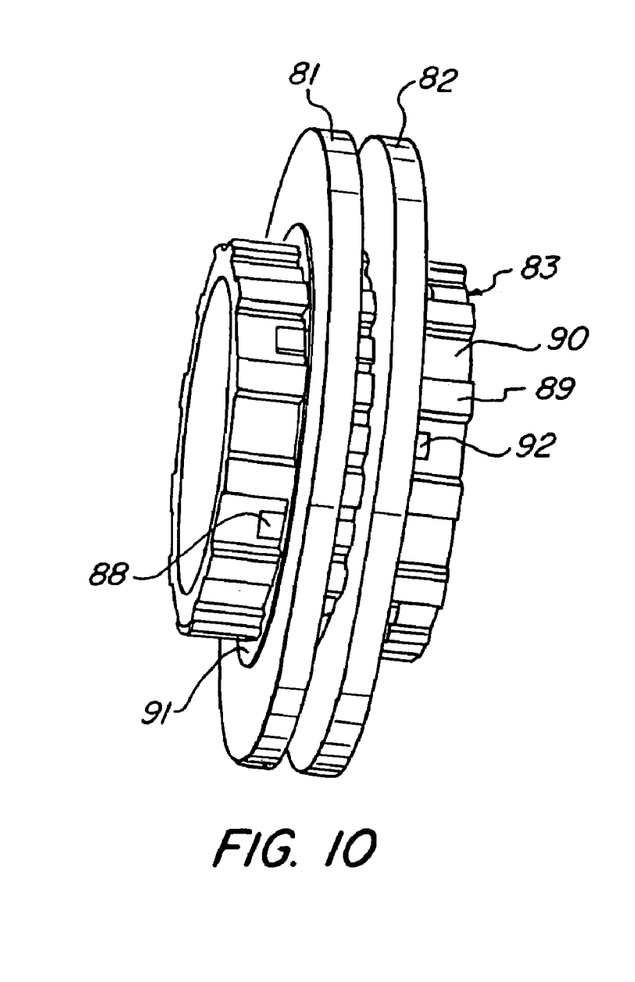
FIGS. 10 and 11 are views corresponding to FIGS. 4 and 5 of a fifth alternative embodiment of the present invention.
Figure 11:
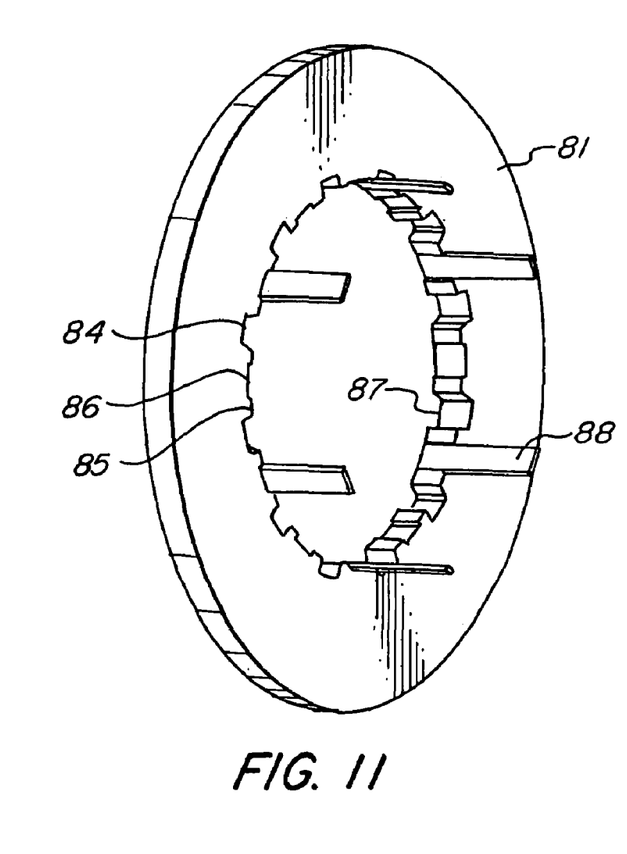

On each brake disc 81, 82 a base ring 87, 91 is fixed on one side of the disc 81, 82. From the base ring 87, 91 a number of legs 88, 92 project in an axial direction. The legs 88, 92 are received in recesses 86 of the raised parts 85 of the splines of the brake disc 81, 82. The base ring 87, 91 is fixed to the brake disc 81, 82 by any suitable means. The base ring 87, 91 may be fixed to the brake disc 81, 82 by means of screws, rivets, welding, soldering, glue etc. If suitable a recess may be formed in the brake disc 81, 82 to receive the base ring 87, 91.

Furthermore, the form of the legs 88, 92 and the recesses 86 are adapted to each other to keep the legs 88, 92 firm in the recesses 86. The legs 88, 92 are preferably integrated parts of the base ring 87, 91, but a person skilled in the art realizes that the legs 88, 92 may be separate parts fixed to the base ring 87, 91 in any suitable way.

The legs 88, 92 will slide in the grooves 90 of the splines of the hub 83. In use the legs 88, 92 will project towards adjacent brake discs 81, 82. The legs 88, 92 of adjacent base rings 87, 91 are placed in alternating grooves 90 of the hub 83, so as not to interfere with each other.

In a sixth embodiment (FIGS. 12 and 13) the disc brake comprises two sliding brake discs 101, 102 received on a hub 103. The brake discs 101, 102 are received sliding in relation to the hub 103 by means of splines 104, 105 and splines 108, 109 on the brake discs 101, 102 and the hub 103, respectively. The splines on the brake discs 101, 102 are formed of grooves 104 and raised parts 105. In the same way the splines of the hub 103 are formed of raised parts 109 and grooves 108. The splines 104, 105; 108, 109 have a general axial extent in the discs 101, 102 and the hub 103, respectively.

Figure 12:
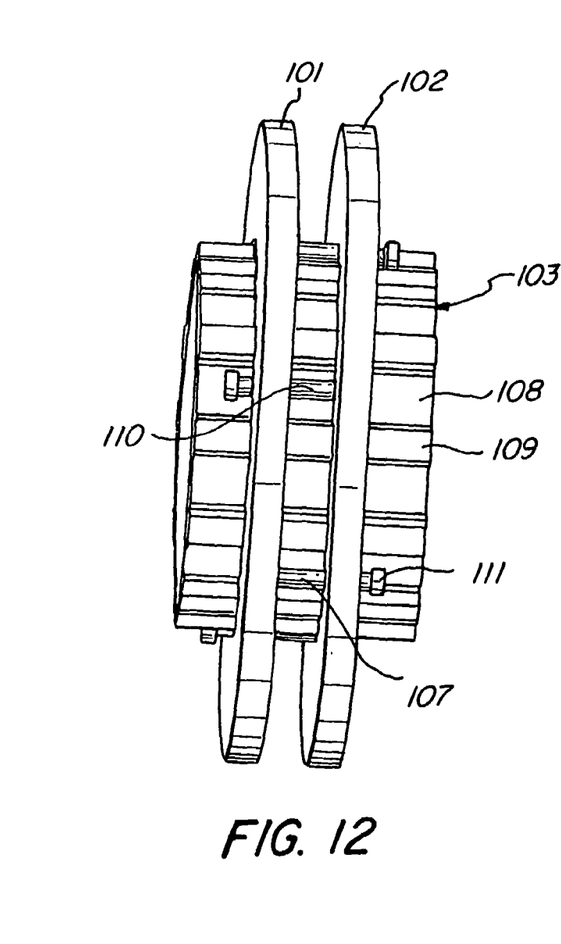
FIGS. 12 and 13 are views corresponding to FIGS. 4 and 5 of a sixth alternative embodiment of the present invention.
Figure 13:
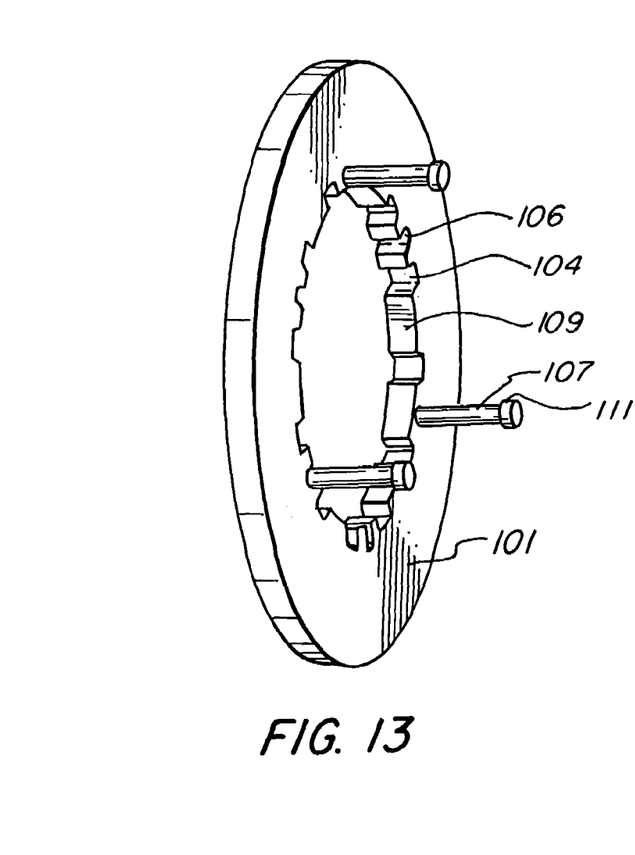

On at least one side of each brake disc 101, 102 pins 107, 110 are arranged. One end of each pin 107, 110 is fixed to the brake disc 101, 102. The pins 107, 110 project from each brake disc 101, 102 directed towards an adjacent brake disc 101, 102. Each pin 107, 110 has a head 111 at the free end. Often the pins 107, 110 have no head 111. The function of the head is mainly as a transport safety device. Even though three pins 107, 110 are shown attached to each brake disc 101, 102 a person skilled in the art realizes that any number of pins 107, 110 may be used.

The pins 107, 110 are received in recesses 106 in adjacent brake discs 101, 102. Thus, the outer form of the pins 107, 110 and the form of the recesses 106 are adapted to each other. The pins 107, 110 will slide in relation to the recesses 106 of adjacent discs 101, 102. Even though only three pins 107, 110 are shown for each disc brake 101, 102, a person skilled in the art realizes that any number of pins 107, 110 may be used. The pins 107, 110 of adjacent discs 101, 102 are positioned to not interfere with each other during movement of the discs 101, 102.

The pins 107, 110 are fixed to the brake discs 101, 102 in any suitable way. Thus, the pins 107, 110 may be fixed by means of threads, welding, soldering, glue etc.

The length of each pin 107, 110 is adapted to the thickness of the brake pads (not shown). Thus, the length should be large enough to enable two or more discs 101, 102 to be separated enough to give room for new, not worn brake pads. As the brake pads are worn during use of the brake the distance between the brake discs 101, 102 will decrease, as is well known.

In a seventh embodiment (FIGS. 14 and 15) brake discs 121, 122 are received on a hub 123. As for the previous embodiments the discs 121, 122 are received sliding on the hub 123 by means of splines 124, 125; 130, 131 of the discs 121, 122 and the hub 123, respectively.

Figure 14:
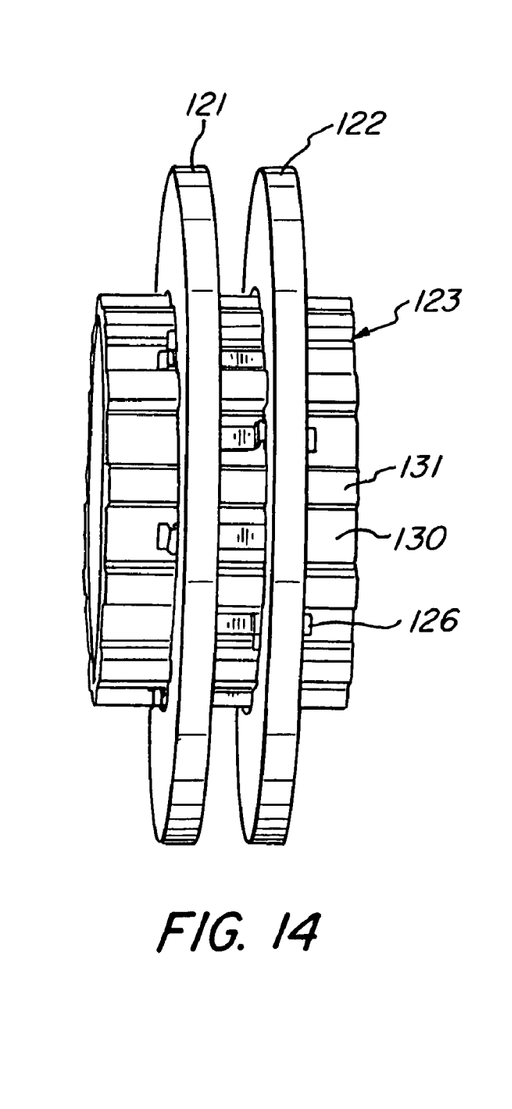
FIGS. 14 and 15 are views corresponding to FIGS. 4 and 5 of a seventh embodiment of the present invention.
Figure 15:
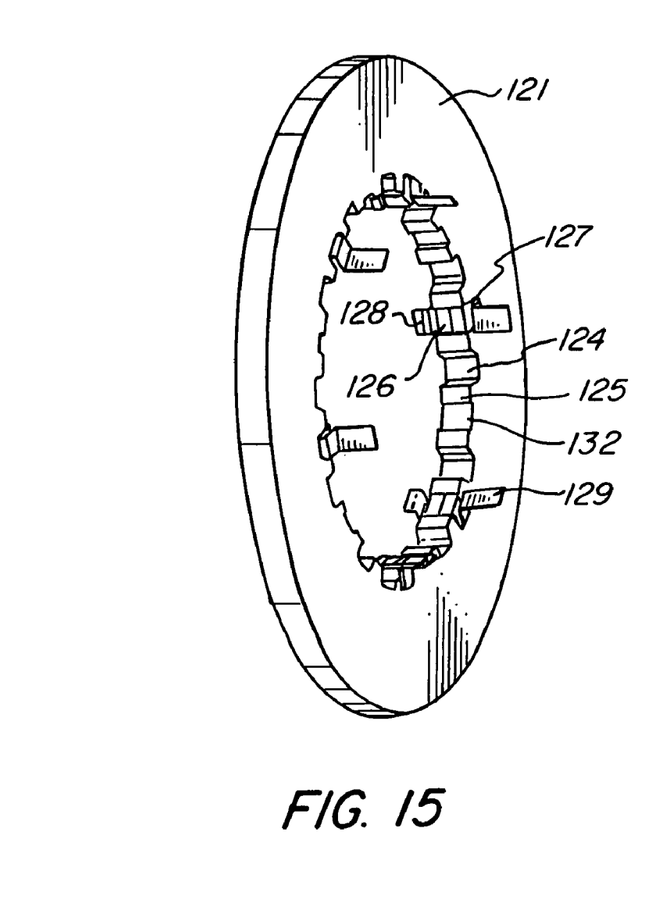

A number of clips 126 are fixed to the inner diameter of each brake disc 121, 122. The clips 126 are fixed to a raised part 125 of the splines of the brake disc 121, 122.

The clips 126 have two folds 127 to be placed on opposite sides of the disc 121, 122. The clips 126 have one short plate 128 and one long plate 129 at each free end, projecting from the folds 127. The plates 128, 129 are to slide in grooves 130 of the splines of the hub 123. The clips 126 are normally held at the discs 121, 122 by means of the folds 127, but further means of fixation may be arranged.

The clips 126 are received in recesses 132 of the raised part 125 of the splines of the disc 121, 122. Such fixation means may be screws, rivets, welding, soldering, glue etc.

In the shown embodiment six clips 126 are arranged on each disc 121, 122, but a person skilled in the art realizes that any number of clips 126 may be used. The clips 126 are arranged in alternating grooves 130 of the splines of the hub 123 in order not to interfere with each other.

A person skilled in the art realizes that the above embodiments may be modified and combined in many different ways.

The concept of all the above embodiments are to increase the support of each disc in order to reduce problems like wobbling, skewing, noise generation etc. and still have relatively thin brake discs. Irrespectively of if rings, legs, pins and/or clips are used as means for widening the support, each brake disc will in practice will have a substantially widened support compared to discs having no extra support means.

The brakes will be more flexible when using the present invention, as the extra support means may be adapted to the intended use. Thus, in e.g. harsh environments it is possible to choose another material for the extra support than normally used. The extra support means is possible to exchange when worn or for adaptation to different environments, vehicles etc. The support may be exchanged at the same time as the brake pads are exchanged if needed.

What is claimed is:

1. A disc brake comprising one or more brake discs received slideable on a hub by means of splines or similar means on the one or more brake discs and hub, respectively, characterized in that the one or more brake discs have a support means to widen the support of one or more brake discs on the hub, and the support means has the form of at least one ring attached to the one or more brake discs;
- characterized in that the at least one ring is attached to the one or more brake discs by means of pins or legs, giving an axial distance between the at least one ring and the one or more brake discs and that the pins or legs are to slide axially in relation to the hub;
- characterized in that the free ends of at least two adjacent legs are connected by beams, having the same curvature as the one or more brake discs;
- wherein the one or more brake discs includes two adjacent brake discs, the distance between one brake disc and the at least one ring attached to it is adapted to the width of brake pads to be used in the disc brake, taking account of the maximal foreseen distance between the two adjacent brake discs.

2. The disc brake of claim 1, characterized in that one end of the pins is fixed to the one or more brake discs; that the pins are slideably received in recesses of an adjacent brake disc; and that the recesses are placed in raised parts of the splines of the adjacent brake disc.

3. The disc brake of claim 1, characterized in that the legs are received in recesses in raised parts of the splines of the one or more brake discs; that the size of the legs are adapted to the size of the recesses; and that the legs are formed around the splines of the one or more brake disc.

4. The disc brake of claim 1, characterized in that the legs are received in the grooves of the splines of the one or more brake discs.

5. A disc brake comprising one or more brake discs received slideable on a hub by means of splines or similar means on the one or more brake discs and hub, respectively, characterized in that the one or more brake discs have a support means to widen the support of one or more brake discs on the hub, and the support means has the form of at least one ring attached to the one or more brake discs;
- characterized in that the at least one ring is attached to the one or more brake discs by means of pins or legs, giving an axial distance between the at least one ring and the one or more brake discs and that the pins or legs are to slide axially in relation to the hub;
- characterized in that the free ends of at least two adjacent legs are connected by beams, having the same curvature as the one or more brake discs;
- characterized in that one end of the pins are fixed to the one or more brake discs; that the pins are slideably received in recesses of an adjacent brake disc; and that the recesses are placed in raised parts of the splines of the adjacent brake disc.

* * * * *